(12) United States Patent
Todd

(10) Patent No.: US 7,998,910 B2
(45) Date of Patent: Aug. 16, 2011

(54) TREATMENT FLUIDS COMPRISING RELATIVE PERMEABILITY MODIFIERS AND METHODS OF USE

(75) Inventor: Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 121 days.

(21) Appl. No.: 12/380,120

(22) Filed: Feb. 24, 2009

(65) Prior Publication Data

US 2010/0216672 A1    Aug. 26, 2010

(51) Int. Cl.
*C09K 8/60* (2006.01)
*E21B 43/16* (2006.01)

(52) U.S. Cl. .................. 507/267; 166/305.1; 166/308.1; 507/209; 507/214

(58) Field of Classification Search .................. 507/267, 507/209, 214; 166/305.1, 308.1
See application file for complete search history.

(56) References Cited

U.S. PATENT DOCUMENTS

| | | |
|---|---|---|
| 2,239,671 A | 4/1941 | Woodhouse |
| 2,278,838 A | 4/1942 | Groote et al. |
| 2,670,329 A | 2/1954 | Jones |
| 2,689,244 A | 9/1954 | Jones |
| 2,703,316 A | 3/1955 | Palmer |
| 2,819,278 A | 1/1958 | De Groots et al. |
| 2,843,573 A | 7/1958 | Melamed |
| 2,863,832 A | 12/1958 | Perrine |
| 2,877,179 A | 3/1959 | Hughes et al. |
| 2,910,436 A | 10/1959 | Fatt et al. |
| 3,008,898 A | 11/1961 | Hughes et al. |
| 3,015,680 A | 1/1962 | Isler et al. |
| 3,052,298 A | 9/1962 | Mallot |
| 3,065,247 A | 11/1962 | De Groots et al. |
| 3,173,484 A | 3/1965 | Huitt et al. |
| 3,195,635 A | 7/1965 | Fast |
| 3,215,199 A | 11/1965 | Dilgren |
| 3,251,415 A | 5/1966 | Bombardieri et al. |
| 3,251,778 A | 5/1966 | Dickson et al. |
| 3,258,428 A | 6/1966 | Dickson et al. |
| 3,265,512 A | 8/1966 | Dickson et al. |
| 3,271,307 A | 9/1966 | Dickson et al. |
| 3,272,650 A | 9/1966 | MacVitte |
| 3,297,090 A | 1/1967 | Dilgren |
| 3,302,719 A | 2/1967 | Fischer |
| 3,307,630 A | 3/1967 | Dilgren et al. |
| 3,326,890 A | 6/1967 | Engelskirchen et al. |
| 3,336,980 A | 8/1967 | Rike |
| 3,347,789 A | 10/1967 | Dickson et al. |
| 3,364,995 A | 1/1968 | Atkins et al. |
| 3,366,178 A | 1/1968 | Malone et al. |
| 3,382,924 A | 5/1968 | Veley et al. |
| 3,404,114 A | 10/1968 | Snyder et al. |
| 3,434,971 A | 3/1969 | Atkins |
| 3,441,085 A | 4/1969 | Gidley |
| 3,451,818 A | 6/1969 | Wareham |
| 3,455,390 A | 7/1969 | Gallus |
| 3,489,222 A | 1/1970 | Millhone et al. |
| 3,601,194 A | 8/1971 | Gallus |
| 3,647,507 A | 3/1972 | Ashcraft |
| 3,647,567 A | 3/1972 | Schweri |
| 3,658,832 A | 4/1972 | Asato et al. |
| 3,689,418 A | 9/1972 | Cenci et al. |
| 3,689,468 A | 9/1972 | Warminster |
| 3,708,013 A | 1/1973 | Dismukes |
| 3,709,298 A | 1/1973 | Pramann |
| 3,744,566 A | 7/1973 | Szabo et al. |
| 3,784,585 A | 1/1974 | Schmitt et al. |
| 3,819,525 A | 6/1974 | Hatterbrun |
| 3,828,854 A | 8/1974 | Templeton et al. |
| 3,868,998 A | 3/1975 | Lybarger et al. |
| 3,902,557 A | 9/1975 | Shaughnessy et al. |
| 3,910,862 A | 10/1975 | Barabas et al. |
| 3,912,692 A | 10/1975 | Casey et al. |
| 3,943,060 A | 3/1976 | Martin et al. |
| 3,948,672 A | 4/1976 | Harnsberger |
| 3,955,993 A | 5/1976 | Curtice |
| 3,960,736 A | 6/1976 | Free et al. |
| 3,968,840 A | 7/1976 | Tate |
| 3,983,941 A | 10/1976 | Fitch |
| 3,998,272 A | 12/1976 | Maly |
| 3,998,744 A | 12/1976 | Arnold et al. |

(Continued)

FOREIGN PATENT DOCUMENTS

CA    2 453 648    7/2004

(Continued)

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.

(Continued)

*Primary Examiner* — Timothy J. Kugel
(74) *Attorney, Agent, or Firm* — Robert A. Kent; McDermott Will & Emery LLP

(57) ABSTRACT

Treatment fluids for and methods of treating subterranean formations are provided. In certain embodiments, a method is provided comprising providing a treatment fluid comprising a relative permeability modifier, a delayed filter cake breaker, and a carrier fluid, contacting at least a portion of a filter cake in a subterranean formation with the treatment fluid, and removing at least a portion of the filter cake.

12 Claims, No Drawings

U.S. PATENT DOCUMENTS

| | | |
|---|---|---|
| 4,052,343 A | 10/1977 | Cunningham |
| 4,052,345 A | 10/1977 | Austin et al. |
| 4,068,718 A | 1/1978 | Cooke, Jr. et al. |
| 4,129,183 A | 12/1978 | Kalfoglou |
| 4,129,534 A | 12/1978 | Cunningham |
| 4,142,595 A | 3/1979 | Anderson et al. |
| 4,152,274 A | 5/1979 | Phillips et al. |
| 4,158,521 A | 6/1979 | Anderson et al. |
| 4,158,726 A | 6/1979 | Kamada et al. |
| 4,169,798 A | 10/1979 | DeMartino |
| 4,172,066 A | 10/1979 | Zweigle et al. |
| 4,228,277 A | 10/1980 | Landoll |
| 4,261,421 A | 4/1981 | Watanabe |
| 4,299,710 A | 11/1981 | Dupre et al. |
| 4,306,981 A | 12/1981 | Blair, Jr. |
| 4,337,828 A | 7/1982 | Blair, Jr. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,387,769 A | 6/1983 | Erbstoesser et al. |
| 4,393,939 A | 7/1983 | Smith et al. |
| 4,395,340 A | 7/1983 | McLaughlin |
| 4,401,789 A | 8/1983 | Gideon |
| 4,439,334 A | 3/1984 | Borchardt |
| 4,440,649 A | 4/1984 | Loftin et al. |
| 4,441,556 A | 4/1984 | Powers et al. |
| 4,447,342 A | 5/1984 | Borchardt et al. |
| 4,460,052 A | 7/1984 | Gockel |
| 4,460,627 A | 7/1984 | Weaver et al. |
| 4,462,718 A | 7/1984 | McLaughlin et al. |
| 4,470,915 A | 9/1984 | Conway |
| 4,498,995 A | 2/1985 | Gockel |
| 4,499,214 A | 2/1985 | Sortwell |
| 4,526,695 A | 7/1985 | Erbstoesser et al. |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,552,670 A | 11/1985 | Lipowski et al. |
| 4,554,081 A | 11/1985 | Borchardt et al. |
| 4,563,292 A | 1/1986 | Borchardt |
| 4,604,216 A | 8/1986 | Irvin et al. |
| 4,608,139 A | 8/1986 | Craun et al. |
| 4,619,776 A | 10/1986 | Mondshine |
| 4,627,926 A | 12/1986 | Peiffer et al. |
| 4,662,448 A | 5/1987 | Ashford et al. |
| 4,671,883 A | 6/1987 | Connell |
| 4,693,639 A | 9/1987 | Hollenbeak et al. |
| 4,694,905 A | 9/1987 | Armbruster |
| 4,699,722 A | 10/1987 | Dymond et al. |
| 4,702,319 A | 10/1987 | Bock et al. |
| 4,715,967 A | 12/1987 | Bellis |
| 4,716,964 A | 1/1988 | Erbstoesser et al. |
| 4,730,028 A | 3/1988 | Bock et al. |
| 4,785,884 A | 11/1988 | Armbruster |
| 4,797,262 A | 1/1989 | Dewitz |
| 4,809,783 A | 3/1989 | Hollenbeck et al. |
| 4,814,096 A | 3/1989 | Evani |
| 4,817,721 A | 4/1989 | Pober |
| 4,828,725 A | 5/1989 | Lai et al. |
| 4,828,726 A | 5/1989 | Himes et al. |
| 4,843,118 A | 6/1989 | Lai et al. |
| 4,848,467 A | 7/1989 | Cantu et al. |
| 4,856,590 A | 8/1989 | Caillier |
| 4,870,167 A | 9/1989 | Zody et al. |
| 4,886,354 A | 12/1989 | Welch et al. |
| 4,941,537 A | 7/1990 | Langemeier et al. |
| 4,956,104 A | 9/1990 | Cowan et al. |
| 4,957,165 A | 9/1990 | Cantu et al. |
| 4,959,432 A | 9/1990 | Fan et al. |
| 4,960,876 A | 10/1990 | Molteni et al. |
| 4,961,466 A | 10/1990 | Himes et al. |
| 4,986,353 A | 1/1991 | Clark et al. |
| 4,986,354 A | 1/1991 | Cantu et al. |
| 4,986,355 A | 1/1991 | Casad et al. |
| 5,051,197 A | 9/1991 | Kalfayan et al. |
| 5,071,934 A | 12/1991 | Peiffer |
| 5,082,056 A | 1/1992 | Tackett, Jr. |
| 5,097,904 A | 3/1992 | Himes |
| 5,105,886 A | 4/1992 | Strubhar et al. |
| 5,142,023 A | 8/1992 | Gruber et al. |
| 5,146,986 A | 9/1992 | Dalrymple |
| 5,160,642 A | 11/1992 | Schield et al. |
| 5,197,544 A | 3/1993 | Himes |
| 5,208,216 A | 5/1993 | Williamson et al. |
| 5,211,234 A | 5/1993 | Floyd |
| 5,216,050 A | 6/1993 | Sinclair |
| 5,244,042 A | 9/1993 | Dovan et al. |
| 5,247,059 A | 9/1993 | Gruber et al. |
| 5,248,665 A | 9/1993 | Hale et al. |
| 5,249,628 A | 10/1993 | Surjaatmadja |
| 5,256,651 A | 10/1993 | Phelps et al. |
| 5,271,466 A | 12/1993 | Harms |
| 5,295,542 A | 3/1994 | Cole et al. |
| 5,325,923 A | 7/1994 | Surjaatmadja et al. |
| 5,330,005 A | 7/1994 | Card et al. |
| 5,342,530 A | 8/1994 | Aften et al. |
| 5,359,026 A | 10/1994 | Gruber |
| 5,360,068 A | 11/1994 | Sprunt et al. |
| 5,363,916 A | 11/1994 | Himes et al. |
| 5,373,901 A | 12/1994 | Norman et al. |
| 5,379,841 A | 1/1995 | Pusch et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,424,284 A | 6/1995 | Patel et al. |
| 5,439,055 A | 8/1995 | Card et al. |
| 5,445,223 A | 8/1995 | Nelson et al. |
| 5,460,226 A | 10/1995 | Lawton et al. |
| 5,464,060 A | 11/1995 | Hale et al. |
| 5,473,059 A | 12/1995 | Yeh |
| 5,475,080 A | 12/1995 | Gruber et al. |
| 5,484,881 A | 1/1996 | Gruber et al. |
| 5,497,830 A | 3/1996 | Boles et al. |
| 5,499,678 A | 3/1996 | Surjaatmadja et al. |
| 5,504,235 A | 4/1996 | Hirose et al. |
| 5,505,787 A | 4/1996 | Yamaguchi |
| 5,512,071 A | 4/1996 | Yam et al. |
| 5,536,807 A | 7/1996 | Gruber et al. |
| 5,591,700 A | 1/1997 | Harris et al. |
| 5,594,095 A | 1/1997 | Gruber et al. |
| 5,597,783 A | 1/1997 | Audibert et al. |
| 5,604,186 A | 2/1997 | Hunt et al. |
| 5,607,902 A | 3/1997 | Smith et al. |
| 5,607,905 A | 3/1997 | Dobson, Jr. et al. |
| 5,637,556 A | 6/1997 | Argillier et al. |
| 5,643,460 A | 7/1997 | Marble et al. |
| 5,646,093 A | 7/1997 | Dino |
| 5,669,456 A | 9/1997 | Audibert et al. |
| 5,670,473 A | 9/1997 | Scepanski |
| 5,681,796 A | 10/1997 | Nimerick |
| 5,698,322 A | 12/1997 | Tsai et al. |
| 5,704,426 A | 1/1998 | Rytlewski et al. |
| 5,720,347 A | 2/1998 | Audibert et al. |
| 5,728,653 A | 3/1998 | Audibert et al. |
| 5,735,349 A | 4/1998 | Dawson et al. |
| 5,765,642 A | 6/1998 | Surjaatmadja |
| 5,791,415 A | 8/1998 | Nguyen et al. |
| 5,833,000 A | 11/1998 | Weaver et al. |
| 5,849,401 A | 12/1998 | El-Afandi et al. |
| 5,853,048 A | 12/1998 | Weaver et al. |
| 5,887,653 A | 3/1999 | Bishop et al. |
| 5,893,416 A | 4/1999 | Read |
| 5,908,073 A | 6/1999 | Nguyen et al. |
| 5,908,814 A | 6/1999 | Patel et al. |
| 5,909,774 A | 6/1999 | Griffith et al. |
| 5,924,488 A | 7/1999 | Nguyen et al. |
| 5,944,106 A | 8/1999 | Dalrymple et al. |
| 5,964,291 A | 10/1999 | Bourne et al. |
| 5,972,848 A | 10/1999 | Audibert et al. |
| 5,979,557 A | 11/1999 | Card et al. |
| 5,990,052 A | 11/1999 | Harris |
| 6,004,400 A | 12/1999 | Bishop et al. |
| 6,020,289 A | 2/2000 | Dymond |
| 6,024,170 A | 2/2000 | McCabe et al. |

| | | | | | | |
|---|---|---|---|---|---|---|
| 6,028,113 | A | 2/2000 | Scepanski | 6,761,218 B2 | 7/2004 | Nguyen et al. |
| 6,047,772 | A | 4/2000 | Weaver et al. | 6,763,888 B1 | 7/2004 | Harris et al. |
| 6,070,664 | A | 6/2000 | Dalrymple et al. | 6,764,981 B1 | 7/2004 | Eoff et al. |
| 6,114,410 | A | 9/2000 | Betzold | 6,767,867 B2 | 7/2004 | Chatterji et al. |
| 6,123,965 | A | 9/2000 | Jacob et al. | 6,767,869 B2 | 7/2004 | DiLullo et al. |
| 6,124,245 | A | 9/2000 | Patel | 6,780,822 B2 | 8/2004 | Cowan et al. |
| 6,131,661 | A | 10/2000 | Conner et al. | 6,787,506 B2 | 9/2004 | Blair et al. |
| 6,135,987 | A | 10/2000 | Tsai et al. | 6,790,812 B2 | 9/2004 | Halliday et al. |
| 6,143,698 | A | 11/2000 | Murphey et al. | 6,793,018 B2 | 9/2004 | Dawson et al. |
| 6,162,766 | A | 12/2000 | Muir et al. | 6,803,348 B2 | 10/2004 | Jones et al. |
| 6,169,058 | B1 | 1/2001 | Le et al. | 6,817,414 B2 | 11/2004 | Lee |
| 6,172,011 | B1 | 1/2001 | Card et al. | 6,846,420 B2 | 1/2005 | Reddy et al. |
| 6,187,839 | B1 | 2/2001 | Eoff et al. | 6,855,672 B2 | 2/2005 | Poelker et al. |
| 6,189,615 | B1 | 2/2001 | Sydansk | 6,877,563 B2 | 4/2005 | Todd et al. |
| 6,194,356 | B1 | 2/2001 | Jones et al. | 6,884,760 B1 | 4/2005 | Brand et al. |
| 6,202,751 | B1 | 3/2001 | Chatterji et al. | 6,896,058 B2 | 5/2005 | Munoz, Jr. et al. |
| 6,209,643 | B1 | 4/2001 | Nguyen et al. | 6,918,445 B2 | 7/2005 | Todd et al. |
| 6,209,646 | B1 | 4/2001 | Reddy et al. | 6,924,254 B2 | 8/2005 | Todd |
| 6,214,773 | B1 | 4/2001 | Harris et al. | 6,933,381 B2 | 8/2005 | Mallon et al. |
| 6,228,812 | B1 | 5/2001 | Dawson et al. | 6,949,491 B2 | 9/2005 | Cooke, Jr. |
| 6,237,687 | B1 | 5/2001 | Barbee, Jr. et al. | 6,962,203 B2 | 11/2005 | Funchess |
| 6,242,390 | B1 | 6/2001 | Mitchell et al. | 6,978,836 B2 | 12/2005 | Nguyen et al. |
| 6,253,851 | B1 | 7/2001 | Schroeder, Jr. et al. | 6,981,552 B2 | 1/2006 | Reddy et al. |
| 6,260,622 | B1 | 7/2001 | Blok et al. | 6,983,798 B2 | 1/2006 | Todd |
| 6,277,900 | B1 | 8/2001 | Oswald et al. | 6,983,801 B2 | 1/2006 | Dawson et al. |
| 6,281,172 | B1 | 8/2001 | Warren et al. | 6,997,259 B2 | 2/2006 | Nguyen et al. |
| 6,283,210 | B1 | 9/2001 | Soliman et al. | 7,000,701 B2 | 2/2006 | Todd et al. |
| 6,291,013 | B1 | 9/2001 | Gibson et al. | 7,001,872 B2 | 2/2006 | Pyecroft et al. |
| 6,291,404 | B2 | 9/2001 | House | 7,007,752 B2 | 3/2006 | Reddy et al. |
| 6,311,773 | B1 | 11/2001 | Todd et al. | 7,008,908 B2 | 3/2006 | Chan et al. |
| 6,323,307 | B1 | 11/2001 | Bigg et al. | 7,021,377 B2 | 4/2006 | Todd et al. |
| 6,326,458 | B1 | 12/2001 | Gruber et al. | 7,021,383 B2 | 4/2006 | Todd et al. |
| 6,328,105 | B1 | 12/2001 | Betzold | 7,036,586 B2 | 5/2006 | Roddy et al. |
| 6,357,527 | B1 | 3/2002 | Norman et al. | 7,036,587 B2 | 5/2006 | Munoz, Jr. et al. |
| 6,358,889 | B2 | 3/2002 | Waggenspack et al. | 7,036,588 B2 | 5/2006 | Munor, Jr. et al. |
| 6,359,047 | B1 | 3/2002 | Thieu et al. | 7,036,589 B2 | 5/2006 | Nguyen |
| 6,364,016 | B1 | 4/2002 | Dalrymple et al. | 7,036,590 B2 | 5/2006 | Harris |
| 6,364,945 | B1 | 4/2002 | Chatterji et al. | 7,066,258 B2 | 6/2006 | Justus et al. |
| 6,380,137 | B1 | 4/2002 | Heier et al. | 7,080,688 B2 | 7/2006 | Todd et al. |
| 6,380,138 | B1 | 4/2002 | Ischy et al. | 7,081,439 B2 | 7/2006 | Sullivan et al. |
| 6,387,986 | B1 | 5/2002 | Moradi-Araghi et al. | 7,091,159 B2 | 8/2006 | Eoff et al. |
| 6,390,195 | B1 | 5/2002 | Nguyen et al. | 7,093,664 B2 | 8/2006 | Todd et al. |
| 6,394,185 | B1 | 5/2002 | Constien | 7,114,568 B2 | 10/2006 | Eoff et al. |
| 6,422,314 | B1 | 7/2002 | Todd et al. | 7,117,942 B2 | 10/2006 | Dalrymple et al. |
| 6,444,316 | B1 | 9/2002 | Reddy et al. | 7,140,438 B2 | 11/2006 | Frost et al. |
| 6,454,003 | B1 | 9/2002 | Chang et al. | 7,159,656 B2 | 1/2007 | Eoff et al. |
| 6,476,169 | B1 | 11/2002 | Eoff et al. | 7,159,658 B2 | 1/2007 | Frost et al. |
| 6,476,283 | B1 | 11/2002 | Devore et al. | 7,182,136 B2 | 2/2007 | Dalrymple et al. |
| 6,485,947 | B1 | 11/2002 | Rajgarhia et al. | 7,195,068 B2 | 3/2007 | Todd |
| 6,488,763 | B2 | 12/2002 | Brothers et al. | 7,195,071 B2 | 3/2007 | Powell et al. |
| 6,494,263 | B2 | 12/2002 | Todd | 7,207,387 B2 | 4/2007 | Eoff et al. |
| 6,497,283 | B1 | 12/2002 | Eoff et al. | 7,211,548 B2 | 5/2007 | Munor, Jr. et al. |
| 6,497,287 | B1 | 12/2002 | Podio et al. | 7,216,705 B2 | 5/2007 | Saini et al. |
| 6,508,305 | B1 | 1/2003 | Brannon et al. | 7,216,707 B2 | 5/2007 | Eoff et al. |
| 6,509,301 | B1 | 1/2003 | Vollmer et al. | 7,220,708 B2 | 5/2007 | Zamora et al. |
| 6,516,885 | B1 | 2/2003 | Munday | 7,273,099 B2 | 9/2007 | East, Jr. et al. |
| 6,527,051 | B1 | 3/2003 | Reddy et al. | 7,276,466 B2 | 10/2007 | Todd et al. |
| 6,543,276 | B2 | 4/2003 | Murphy, Jr. et al. | 7,398,825 B2 | 7/2008 | Nguyen et al. |
| 6,554,071 | B1 | 4/2003 | Reddy et al. | 7,431,088 B2 | 10/2008 | Moorehead et al. |
| 6,562,762 | B2 | 5/2003 | Cowan et al. | 2001/0016562 A1 | 8/2001 | Muir et al. |
| 6,569,814 | B1 | 5/2003 | Brady et al. | 2002/0036088 A1 | 3/2002 | Todd |
| 6,569,983 | B1 | 5/2003 | Treybig et al. | 2002/0125012 A1 | 9/2002 | Dawson et al. |
| 6,599,863 | B1 | 7/2003 | Palmer et al. | 2002/0139532 A1 | 10/2002 | Todd et al. |
| 6,601,648 | B2 | 8/2003 | Ebinger | 2003/0008779 A1 | 1/2003 | Chen et al. |
| 6,607,035 | B1 | 8/2003 | Reddy et al. | 2003/0019627 A1 | 1/2003 | Qu et al. |
| 6,609,578 | B2 | 8/2003 | Patel et al. | 2003/0029230 A1 | 2/2003 | Murphy, Jr. et al. |
| 6,626,241 | B2 | 9/2003 | Nguyen | 2003/0060374 A1 | 3/2003 | Cooke, Jr. |
| 6,627,719 | B2 | 9/2003 | Whipple et al. | 2003/0104948 A1 | 6/2003 | Poelker et al. |
| 6,637,517 | B2 | 10/2003 | Samuel et al. | 2003/0114314 A1 | 6/2003 | Ballard et al. |
| 6,656,885 | B2 | 12/2003 | House et al. | 2003/0114317 A1 | 6/2003 | Benton et al. |
| 6,667,279 | B1 | 12/2003 | Hessert et al. | 2003/0130133 A1 | 7/2003 | Vollmer |
| 6,669,771 | B2 | 12/2003 | Tokiwa et al. | 2003/0188766 A1 | 10/2003 | Banerjee et al. |
| 6,681,856 | B1 | 1/2004 | Chatterji et al. | 2003/0191030 A1 | 10/2003 | Blair et al. |
| 6,686,328 | B1 | 2/2004 | Binder | 2003/0234103 A1 | 12/2003 | Lee et al. |
| 6,702,023 | B1 | 3/2004 | Harris et al. | 2004/0014607 A1 | 1/2004 | Sinclair et al. |
| 6,710,019 | B1 | 3/2004 | Sawdon et al. | 2004/0018943 A1 | 1/2004 | Pyecroft et al. |
| 6,710,107 | B2 | 3/2004 | Audibert et al. | 2004/0040706 A1 | 3/2004 | Hossaini et al. |
| 6,737,385 | B2 | 5/2004 | Todd et al. | 2004/0045712 A1 | 3/2004 | Eoff et al. |
| 6,743,288 | B2 | 6/2004 | Eoff et al. | 2004/0055747 A1 | 3/2004 | Lee |

| | | |
|---|---|---|
| 2004/0070093 A1 | 4/2004 | Mathiowitz et al. |
| 2004/0094300 A1 | 5/2004 | Sullivan et al. |
| 2004/0102331 A1 | 5/2004 | Chan et al. |
| 2004/0106525 A1 | 6/2004 | Willberg et al. |
| 2004/0138068 A1 | 7/2004 | Rimmer et al. |
| 2004/0140094 A1 | 7/2004 | Todd et al. |
| 2004/0152601 A1 | 8/2004 | Still et al. |
| 2004/0152602 A1 | 8/2004 | Boles |
| 2004/0162386 A1 | 8/2004 | Altes et al. |
| 2004/0163814 A1 | 8/2004 | Todd et al. |
| 2004/0171495 A1 | 9/2004 | Zamora et al. |
| 2004/0173353 A1 | 9/2004 | Todd |
| 2004/0186024 A1 | 9/2004 | Todd |
| 2004/0214724 A1 | 10/2004 | Todd et al. |
| 2004/0216875 A1 | 11/2004 | Todd et al. |
| 2004/0216876 A1 | 11/2004 | Lee |
| 2004/0220058 A1 | 11/2004 | Eoff et al. |
| 2004/0229756 A1 | 11/2004 | Eoff et al. |
| 2004/0229757 A1 | 11/2004 | Eoff et al. |
| 2004/0231845 A1 | 11/2004 | Cooke, Jr. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2004/0261999 A1 | 12/2004 | Nguyen |
| 2005/0000694 A1 | 1/2005 | Dalrymple et al. |
| 2005/0006095 A1 | 1/2005 | Justus et al. |
| 2005/0028976 A1 | 2/2005 | Nguyen |
| 2005/0032152 A1 | 2/2005 | Powell et al. |
| 2005/0034861 A1 | 2/2005 | Saini et al. |
| 2005/0034865 A1 | 2/2005 | Todd et al. |
| 2005/0034868 A1 | 2/2005 | Frost et al. |
| 2005/0045328 A1 | 3/2005 | Frost et al. |
| 2005/0051363 A1 | 3/2005 | Munor, Jr. et al. |
| 2005/0056423 A1 | 3/2005 | Todd et al. |
| 2005/0059556 A1 | 3/2005 | Munor, Jr. et al. |
| 2005/0059557 A1 | 3/2005 | Todd et al. |
| 2005/0059558 A1 | 3/2005 | Blauch et al. |
| 2005/0061504 A1 | 3/2005 | Frost et al. |
| 2005/0103496 A1 | 5/2005 | Todd et al. |
| 2005/0126780 A1 | 6/2005 | Todd et al. |
| 2005/0126785 A1 | 6/2005 | Todd |
| 2005/0130848 A1 | 6/2005 | Todd et al. |
| 2005/0137094 A1 | 6/2005 | Weaver et al. |
| 2005/0155796 A1 | 7/2005 | Eoff et al. |
| 2005/0161220 A1 | 7/2005 | Todd et al. |
| 2005/0164894 A1 | 7/2005 | Eoff et al. |
| 2005/0167104 A1 | 8/2005 | Roddy et al. |
| 2005/0167105 A1 | 8/2005 | Roddy et al. |
| 2005/0178549 A1 | 8/2005 | Eoff et al. |
| 2005/0178553 A1 | 8/2005 | Harris |
| 2005/0183741 A1 | 8/2005 | Surjaatmadja et al. |
| 2005/0194140 A1 | 9/2005 | Dalrymple et al. |
| 2005/0199396 A1 | 9/2005 | Sierra et al. |
| 2005/0205258 A1 | 9/2005 | Reddy et al. |
| 2005/0205266 A1 | 9/2005 | Todd et al. |
| 2005/0230114 A1 | 10/2005 | Eoff et al. |
| 2005/0230116 A1 | 10/2005 | Eoff et al. |
| 2005/0252659 A1 | 11/2005 | Sullivan et al. |
| 2005/0261137 A1 | 11/2005 | Todd |
| 2005/0272613 A1 | 12/2005 | Cooke, Jr. |
| 2005/0274517 A1 | 12/2005 | Blauch et al. |
| 2005/0277554 A1 | 12/2005 | Blauch et al. |
| 2005/0279502 A1 | 12/2005 | Eoff et al. |
| 2005/0284632 A1 | 12/2005 | Dalrymple et al. |
| 2006/0016596 A1 | 1/2006 | Pauls et al. |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen et al. |
| 2006/0105917 A1 | 5/2006 | Munoz, Jr. et al. |
| 2006/0105918 A1 | 5/2006 | Munoz, Jr. et al. |
| 2006/0111247 A1 | 5/2006 | Munor, Jr. et al. |
| 2006/0124309 A1 | 6/2006 | Nguyen et al. |
| 2006/0137875 A1 | 6/2006 | Dusterhoft et al. |
| 2006/0162928 A1 | 7/2006 | Collins et al. |
| 2006/0169182 A1 | 8/2006 | Todd et al. |
| 2006/0169449 A1 | 8/2006 | Mang et al. |
| 2006/0169450 A1 | 8/2006 | Mang et al. |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini et al. |
| 2006/0185848 A1 | 8/2006 | Surjaatmadja et al. |
| 2006/0205608 A1 | 9/2006 | Todd |
| 2006/0234874 A1 | 10/2006 | Eoff et al. |
| 2006/0240994 A1 | 10/2006 | Eoff et al. |
| 2006/0266522 A1 | 11/2006 | Eoff et al. |
| 2006/0283592 A1 | 12/2006 | Sierra et al. |
| 2006/0283597 A1 | 12/2006 | Schriener et al. |
| 2007/0012445 A1 | 1/2007 | Nguyen et al. |
| 2007/0029087 A1 | 2/2007 | Nguyen et al. |
| 2007/0049501 A1 | 3/2007 | Saini et al. |
| 2007/0111898 A1 | 5/2007 | Frost et al. |
| 2007/0114032 A1 | 5/2007 | Stegent et al. |
| 2007/0123433 A1 | 5/2007 | Sarkar et al. |
| 2007/0169938 A1 | 7/2007 | Moorehead et al. |
| 2007/0173416 A1 | 7/2007 | Moorehead et al. |
| 2007/0281868 A1* | 12/2007 | Pauls et al. .......... 507/213 |
| 2008/0070805 A1 | 3/2008 | Munoz et al. |
| 2008/0070807 A1 | 3/2008 | Munoz et al. |
| 2008/0070808 A1 | 3/2008 | Munoz et al. |
| 2008/0110624 A1 | 5/2008 | Nguyen et al. |
| 2008/0139411 A1 | 6/2008 | Harris et al. |
| 2008/0139415 A1 | 6/2008 | Todd et al. |
| 2008/0173448 A1 | 7/2008 | Nguyen et al. |
| 2008/0173451 A1* | 7/2008 | Reddy et al. .......... 166/308.2 |
| 2008/0194430 A1 | 8/2008 | Welton et al. |
| 2008/0196897 A1 | 8/2008 | Nguyen |
| 2008/0287325 A1 | 11/2008 | Thompson et al. |
| 2009/0203555 A1* | 8/2009 | Milne et al. .......... 507/222 |

FOREIGN PATENT DOCUMENTS

| | | |
|---|---|---|
| DE | 2 250 552 | 4/1974 |
| EP | 0 383 337 | 8/1990 |
| EP | 0 510 762 | 4/1992 |
| EP | 0 879 935 | 11/1998 |
| EP | 0 896 122 | 2/1999 |
| EP | 1 033 378 | 9/2000 |
| EP | 1 152 121 | 11/2001 |
| EP | 1 178 099 | 2/2002 |
| EP | 1 193 365 | 4/2002 |
| EP | 1 166 866 | 10/2002 |
| EP | 1 260 809 | 11/2002 |
| EP | 1 312 753 | 5/2003 |
| EP | 1 413 710 | 4/2004 |
| EP | 1 441 104 | 7/2004 |
| EP | 1 460 121 | 9/2004 |
| EP | 1 223 207 | 7/2005 |
| GB | 2 221 940 | 2/1990 |
| GB | 2 335 428 | 9/1999 |
| GB | 2 412 389 | 9/2005 |
| GB | 2 415 986 | 1/2006 |
| WO | WO 93/15164 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 99/49183 | 9/1999 |
| WO | WO 99/50530 | 10/1999 |
| WO | WO 00/57022 | 9/2000 |
| WO | WO 00/78890 | 12/2000 |
| WO | WO 01/02698 | 1/2001 |
| WO | WO 01/87797 | 11/2001 |
| WO | WO 02/12674 | 2/2002 |
| WO | WO 02/055843 | 7/2002 |
| WO | WO 02/097236 | 12/2002 |
| WO | WO 03/027431 | 4/2003 |
| WO | WO 03/056130 | 7/2003 |
| WO | WO 2004/007905 | 1/2004 |
| WO | WO 2004/022667 | 3/2004 |
| WO | WO 2004/037946 | 5/2004 |
| WO | WO 2004/038176 | 5/2004 |
| WO | WO 2004/079156 | 9/2004 |
| WO | WO 2004/094780 | 11/2004 |
| WO | WO 2004/094781 | 11/2004 |
| WO | WO 2004/101706 | 11/2004 |

| WO | WO 2005/028587 | 3/2005 |
| WO | WO 2005/028588 | 3/2005 |
| WO | WO 2005/049962 | 6/2005 |
| WO | WO 2005/059303 | 6/2005 |
| WO | WO 2005/066451 | 7/2005 |
| WO | WO 2007/026144 | 3/2007 |
| WO | WO 2007/063315 | 6/2007 |
| WO | WO 2007/083128 | 7/2007 |
| WO | WO 2009/098668 A1 | 8/2009 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, presented at the 46th Annual Technical Meeting of the Petroleum Society of CIM in Banff, Alberta, Canada, May 14-17, 1995.

Halliburton, 2001 Press Releases, *Halliburton Technology Uses Revolutionary Polymer System to Control Unwanted Water Production*, 2002 Halliburton, pp. 1-2, 2001.

Halliburton, 2001 Press Releases, *First Halliburton H2Zero™ Conformance Solution Job Performed for a Producing Well in Egypt*, 2002 Halliburton, pp. 1-2, 2001.

Halliburton, 2001 Press Releases, *Halliburton Performs First H2Zero™ Conformance Solution Job in North America*, 2002 Halliburton, pp. 1-2, 2001.

BJ Services Company, *Aquacon, Product Information*, Aug. 1, 2001, pp. 1-2.

BJ Services Company, *Aquatrol I, Product Information*, Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy*, SPE 64650, Society of Petroleum Engineers Inc., presented at the SPE International Oil and Gas Conference and Exhibition in China held in Beijing, China, Nov. 7-10, 2000.

Proett, et al., *Advanced Permeability and Anisotropy Measurements While Testing and Sampling in Real-time Using a Dual Probe Formation Tester*, SPE 62919, Society of Petroleum Engineers Inc., presented at the 2000 SPE Annual Technical Conference and Exhibition held in Dallas, Texas, Oct. 1-4, 2000.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.

Parker, et al., *Laser Drilling: Effects of Beam Application Methods on Improving Rock Removal*, SPE 84353, Society of Petroleum Engineers Inc., presented at the SPE Annual Technical Conference and Exhibition held in Denver, Colorado, Oct. 5-8, 2003.

Xu, et al., *Modeling of Laser Spallation Drilling of Rocks for Gas— and Oilwell Drilling*, SPE 95746, Society of Petroleum Engineers Inc., presented at the 2005 SPE Annual Technical Conference and Exhibition held in Dallas, Texas, Oct. 9-12, 2005.

Batarseh, et al., *Well Perforation Using High-Power Lasers*, SPE 84418, Society of Petroleum Engineers Inc., presented at the SPE Annual Technical Conference and Exhibition held in Denver, Colorado, Oct. 5-8, 2003.

Gahan, et al., *Analysis of Efficient High-Power Fiber Lasers for Well Perforation*, SPE 90661, Society of Petroleum Engineers Inc., presented at the SPE Annual Technical Conference and Exhibition held in Houston, Texas, Sep. 26-29, 2004.

Gahan, et al., *Effect of Downhole Pressure Conditions on High-Power Laser Perforation*, SPE 97093, Society of Petroleum Engineers, presented at the 2005 SPE Annual Technical Conference and Exhibition held in Dallas, Texas, Oct. 9-12, 2005.

Halliburton brochure entitled *Baroid Fluid Services N-FLOW™ Filter Cake Breaker Systems*, SDS-017, 2007.

Halliburton brochure entitled *Baroid Fluid Services N-FLOW™ Filter Cake Breaker Systems*, SDS-017-A4, 2007.

Halliburton Product Data Sheet entitled *Baroid Fluid Services N-FLOW™ 412*, Feb. 8, 2008.

Halliburton Product Data Sheet entitled *Baroid Fluid Services N-FLOW™ 408*, Feb. 8, 2008.

Halliburton Product Data Sheet entitled *Baroid Fluid Services N-FLOW™ 325*, Feb. 8, 2008.

Halliburton brochure entitled *Sand Control AccuBreak[SM] Service*, HO5742, 2007.

Halliburton Solution Profile BSS08-053 entitled *N-FLOW™ 325 Filter Cake Breaker Helped Free Fishing Assembly and 7" Casing in Limestone Formation*, 2008.

Halliburton Solution Profile BSS08-044 entitled *N-FLOW™ Delayed-Reaction Filter Cake Breaker Helped Operator Improve Wellbore Producibility and Save Rig Time*, 2008.

Halliburton Solution Profile BSS08-027 entitled *N-FLOW™ Filter Cake Breaker Helped Operator Put Well on Production Three Months Faster for $5M+ Value*, 2008.

Halliburton Solution Profile BSS08-018 entitled *New High-Temperature N-FLOW™ 408 Filter Cake Braeker Helped Improve Producibility in High-Angle Reservoir*, 2008.

Halliburton Solution Profile BSS08-016 entitled *N-FLOW™ Breaker System Helped Free Stuck Pipe in Limestone Foundation*, 2008.

Halliburton Solution Profile BSS-08-013 entitled *Production doubled in Umm Gudair field in Kuwait by utilizing BARADRIL-N™ additive and N-FLOW™ 325 braeker in horizontal sidetrack wells*, 2008.

Halliburton Solution Profile BSS05-017 entitled *First Use of N-FLOW™ Breaker System to Treat Main and Lateral Horizontal Intervals*, 2005.

Halliburton Solution Profile BSS03-046 entitled *Delayed reaction of the N-FLOW™ AO filter cake breaker system provided uniform wellbore cleaning, saving money for the operator and improving production rates*, 2003.

Halliburton Solution Profile BSS03-030 entitled *N-FLOW™ AO Filter Cake Breaker System Esetablishes Low Damage Ratio on 1,200 ft Horizontal Expandable Screen Completion in the Deepwater Campos Basin*, 2003.

Halliburton Solution Profile BSS03-011 entitled *N-FLOW™ Breaker System Provides 60,000 bbl/day Injection Rate on 7,000 ft Horizontal Well*, 2003.

Halliburton Solution Profile BSS03-010 entitled *N-FLOW™ Breaker System Increases Productivity Index in 2,100 ft Horizontal Interval*, 2003.

Todd, B., et al., *An Innovative System for Complete Cleanup of a Drill-In Fluid Filter Cake*, SPE 86494, 2004, Society of Petroleum Engineers, Inc., presented at SPE International Symposium and Exhibition on Formation Damage Control, Lafayette, Louisiana, Feb. 18-20, pp. 1-9.

Todd, B., et al., *Laboratory Device for Testing of Delayed-Breaker Solutions on Horizontal Wellbore Filter Cakes*, SPE 68968, 2001, Society of Petroleum Engineers, Inc., presented at 2001 SPE European Formation Damage Conference, The Hague, The Netherlands, May 21-22, pp. 1-9.

Simmons, et al., *Poly(phenyllactide): Synthesis, Characterization, and Hydrolytic Degradation*, Biomacromolecules, vol. 2, No. 2, 2001, pp. 658-663.

Yin, et al., *Preparation and Characterization of Substituted Polylactides*, American Chemical Society, Macromolecules, vol. 32, No. 23, 1999, pp. 7711-7718.

Yin, et al., *Synthesis and Properties of Polymers Derived from Substituted Lactic Acids*, American Chemical Society, Ch. 12, 2001, pp. 147-159.

Cantu, et al., *Laboratory and Field Evaluation of a Combined Fluid-Loss-Control Additive and Gel Breaker for Fracturing Fluids*, SPE 18211, Society of Petroleum Engineers, 1990.

Love, et al., *Selectively Placing Many Fractures in Openhole Horizontal Wells Improves Production*, SPE 50422, Society of Petroleum Engineers, 1998.

McDaniel, et al., *Evolving New Stimulation Process Proves Highly Effective in Level 1 Dual-Lateral Completion,* ,SPE 78697, Society of Petroleum Engineers, 2002.

Albertsson, et al., *Aliphatic Polyesters: Synthesis, Properties and Applications*, Advances in Polymer Science, vol. 157, Degradable Aliphatic Polyesters, 2002.

Dechy-Cabaret, et al., *Controlled Ring-Opening Polymerization of Lactide and Glycolide*, American Chemical Society, Chemical Reviews, A-Z, AA-AD, 2004.

Funkhouser, et al., *Synthetic Polymer Fracturing Fluid for High-Temperature Applications*, SPE 80236, Society of oPetroleum Engineers, 2003.

*Chelating Agents*, Encyclopedia of Chemical Technology, vol. 5, pp. 764-795, 2001.

Vichaibun, et al., *A New Assay for the Enzymatic Degradation of Polylactic Acid, Short Report*, ScienceAsia, vol. 29, 2003, pp. 297-300.

Halliburton, *SurgiFrac$^{SM}$ Service, A Quick and Cost-Effective Method to Help Boost Production from Openhole Horizontal Completions*, Halliburton Communications, HO3297, 2002.

Halliburton, *CobraFrac$^{SM}$ Service, Coiled Tubing Fracturing-Cost Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced , Shorten Cycle Time and Reduce Capex*, Apr. 2003.

Y. Chiang, et al., *Hydrolysis of Ortho Esters; Further Investigation of the Factors Which Control the Rate-Determining Step* (abstract), J. Am. Chem. Soc., vol. 105 (XP-002322842), Nov. 16, 1993.

M. Ahmad, et al., *Ortho Ester Hydrolysis: Direct Evidence for a Three-Stage Reaction Mechanism* (abstract), J. Am. Chem. Soc., vol. 101, No. 10 (XP-002322843), May 9, 1979.

Skrabal, et al., *The Hydrolysis Rate of Orthoformic Acid Ethyl Ether*, Chemical Institute of the University of Graz, Jan. 13, 1921 pp. 1-38.

Heller, et al., *Poly(ortho esters)-From Concept to Reality*, Biomacromolecules, vol. 5, No. 5, 2004, pp. 1625-1632.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 1, 1999.

Ng, et al., *Synthesis and Erosion Studies of Self-Catalyzed Poly(ortho esters)*, Americn Chemical Society, vol. 30, No. 4, 1997, pp. 770-772.

Ng, et al., *Development of a Poly(ortho ester) Prototype with a Latent Acid in the Polymer Backbone for 5-fluorouracil Delivery*, Journal of Controlled Release 65, 2000.

Rothen-Weinhold, et al., *Release of BSA from poly(ortho ester) extruded thin strands*, Journal of Controlled Release 71, 2001, pp. 31-37.

Heller, et al., *Poly(ortho esters)—their development and some recent applications*, Journal of Pharmaceutics and Biopharmaceutics, 50, 2000, pp. 121-128.

Heller, et al., *Poly(ortho esters): synthesis, characterization, properties and uses*, Advanced Drug Delivery Reviews, 54, 2002, pp. 1015-1039.

Heller, et al., *Poly(ortho esters) for the Pulsed and Continuous Delivery of Peptides and Proteins*, Controlled Release and Biiomedical Polymers Department, SRI International, 1995.

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight for Auto-Catalyzed Poly(ortho ester) Obtained by Polycondensation Reaction*, International Journal of Polymer Anal. Charact., 7: 145-161, 2002.

Heller, et al., *Release of Norethindrone from Poly(Ortho Esters)*, Polymer Engineering and Science, Mid-Aug. 1981, vol. 21, No. 11, pp. 727-731.

Cordes, et al., *Mechanism and Catalysis for Hydrolysis of Acetals, Ketals, and Other Esters*, Department of Chemistry, Indiana University, Bloomington, Indiana, Chemical Reviews, vol. 74, No. 5, 1974.

Mang, Michael, et al., *Self-Degrading Fibers and Associated Methods of Use and Manufacture,*, filed Jan. 31, 2005 as U.S. Appl. No. 11/047,876.

Mang, Michael, et al., *Degradable Particulate Generation and Associated Methods*, filed Feb. 2, 2005, as U.S. Appl. No. 11/049,600.

Todd, Bradley, et al., *Methods of Controlling the Degradation Rate of Hydrolytically Degradable Materials*, filed Jun. 7, 2005 as U.S. Appl. No. 11/147,093.

Saini, Rajesh, *Degradable Surfactants and Methods for Use* filed May 12, 2005 as U.S. Appl. No. 11/128,060.

Saini, Rajesh, *Degradable Surfactants and Methods for Use* filed May 12, 2005 as U.S. Appl. No. 11/127,583.

Nguyen, Philip, et al., *Methods for Controlling Water and Sand Production in Subterranean Wells* filed Jul. 15, 2005 as U.S. Appl. No. 11/183,028.

Morrison, Robert, et al., *Organic Chemistry*, Sixth Edition, 1992, pp. 242-243.

Schriener, Kirk, et al., *Methods of Degrading Filter Cakes in a Subterranean Formation* filed Aug. 24, 2006 as U.S. Appl. No. 11/509,411.

Munoz, T., et al., *Improved Drill-In Fluids and Associated Methods* filed Sep. 20, 2006 as U.S. Appl. No. 11/524,116.

Munoz, T., et al., *Improved Drill-In Fluids and Associated Methods* filed Sep. 20, 2006 as U.S. Appl. No. 11/524,828.

Office action mailed Oct. 24, 2008 for U.S. Appl. No. 11/524,828.
Office action mailed Oct. 30, 2008 for U.S. Appl. No. 11/524,116.
Office action mailed Oct. 24, 2008 for U.S. Appl. No. 11/523,908.
U.S. Appl. No. 12/080,647, filed Apr. 4, 2008.
International Search Report and Written Opinion for PCT/GB2010/000314 dated Jun. 15, 2010.

* cited by examiner

TREATMENT FLUIDS COMPRISING RELATIVE PERMEABILITY MODIFIERS AND METHODS OF USE

BACKGROUND OF THE INVENTION

The present invention relates to fluids useful for subterranean operations, and more particularly, to novel treatment fluids and methods for the removal of filter cake in subterranean formations.

When well bores are drilled into subterranean formations, drilling fluids are used which will minimize damage to the permeability of the formations and their ability to produce hydrocarbons. Servicing fluids may be used when completion operations are conducted in producing formations or when conducting work-over operations in the formations. The drilling and servicing fluids may deposit a layer of particles known as "filter cake" on the walls of the well bores within the producing formations. The filter cake, among other things, may prevent the drilling and servicing fluids from being lost into the formations and/or limit drill solids from entering the porosities of the producing formations.

Well bores drilled in certain subterranean formations are sometimes completed as open holes, i.e., without a casing or liner installed therein. Special drilling fluids referred to in the art as "drill-in fluids" may be used to drill such well bores, among other reasons, to minimize the damage to the permeability of the producing zones or formations. The drill-in fluid may form a filter cake on the walls of the well bore, which may prevent or reduce fluid loss during drilling, and upon completion of the drilling, may stabilize the well bore during subsequent completion operations such as placing a gravel pack in the well bore.

After completion operations in the well bore have been completed, the filter cake remaining on the walls of the well bore must be removed. This can be accomplished, among other ways, by contacting the filter cake with an aqueous acid solution. However, the use of an aqueous acid solution may be hazardous to personnel or may cause corrosion on surfaces and/or equipment in the well bore. Also, the aqueous acid solution may react rapidly at the initial point of contact with the well bore to create a fluid loss zone into which the rest of the acid is lost, leaving much of the filter cake untreated and in place.

As an alternative method, acid generating compounds have been employed for filter cake removal in place of aqueous acid solutions. Acid generating compounds produce acid over time and thus may be less hazardous to personnel. Because of this time-dependent release of acid, these compounds also may be able to flow further into the well bore as they react with the filter cake or completely across the interval of interest, removing a larger amount of the filter cake and reducing the creation of fluid loss zones.

Such treatments with acid generating compounds may be performed independent of other processes, or they may be performed during a completion operation, such as the installation of a sand screen and/or gravel pack. The inclusion of these compounds in fluids for completion operations may provide a more time- and cost-effective well completion procedure. However, since the exact field conditions and make up of the drill-in fluid filter cake may not be known precisely beforehand, the break may not be accomplished at the planned time. The inclusion of these compounds in completion fluids could then result in premature removal of portions of the filter cake, which may result in a loss of the completion fluid into the surrounding portions of the subterranean formation. Treatments with these compounds also may require a substantial amount of testing in order to determine the proper amount of such compounds to most effectively produce the desired time-dependent filter cake removal.

SUMMARY OF THE INVENTION

The present invention relates to fluids useful for subterranean operations, and more particularly, to novel treatment fluids and methods for the removal of filter cake in subterranean formations.

In certain embodiments, the present disclosure provides a method comprising providing a treatment fluid comprising a relative permeability modifier, a delayed filter cake breaker, and a carrier fluid, contacting at least a portion of a filter cake in a subterranean formation with the treatment fluid, and removing at least a portion of the filter cake.

In certain embodiments, the present disclosure provides a method comprising providing a treatment fluid comprising a relative permeability modifier, a delayed filter cake breaker, a plurality of particulates, and a carrier fluid, contacting a portion of a subterranean formation with the treatment fluid, and depositing at least a portion of the plurality of particulates in a portion of the subterranean formation to form a gravel pack while removing at least a portion of a filter cake contained in a portion of the subterranean formation.

In certain embodiments, the present disclosure provides a treatment fluid comprising a relative permeability modifier, a delayed filter cake breaker, a plurality of particulates, and a carrier fluid.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to fluids useful for subterranean operations, and more particularly, to novel treatment fluids and methods for the removal of filter cake in subterranean formations.

The treatment fluids of the present invention generally comprise a relative permeability modifier, a delayed filter cake breaker, and a carrier fluid. As used herein, "relative permeability modifier" refers to any material capable of at least partially reducing the permeability of a subterranean formation to aqueous fluids without substantially reducing the permeability of the subterranean formation to hydrocarbons. As used herein, the term "delayed filter cake breaker" refers to any material or composition capable of removing at least a portion of the filter cake in a well bore after a desired length of time. The treatment fluids and methods of the present invention may be used to remove filter cakes during or after a completion operation in such a way that, among other things, may reduce or prevent unwanted loss of fluid into the formation and/or facilitate more even or complete removal of the filter cake from the formation and well bore. Additionally, the treatment fluids and methods of the present invention may allow for high concentrations of delayed filter cake breaker to be used. The treatment fluids and method of the present invention may also reduce the substantial amount of testing that may be associated with the use of conventional treatment fluids comprising delayed filter cake breakers The carrier fluid of the treatment fluids of the present invention may be any fluid comprising an aqueous component. Suitable aqueous components may include, but are not limited to, freshwater, saltwater, brine (e.g., saturated or unsaturated saltwater), or seawater. Generally, the aqueous component may be from any source, provided that it does not contain components that may adversely affect other components in the treatment fluid. Suitable carrier fluids may be aqueous fluids, emulsions, or foams. One of ordinary skill in the art, with the benefit of the present disclosure, will recognize suitable carrier fluids for use in the treatment fluids and methods of the present invention.

The relative permeability modifiers useful in the present invention may comprise any relative permeability modifier that is suitable for use in subterranean operations. After introducing the relative permeability modifier into a portion of the subterranean formation, it is believed that it attaches to surfaces within the porosity of the subterranean formation, so as to reduce the permeability of the portion of the subterranean formation to aqueous fluids without substantially changing its permeability to hydrocarbons. Examples of suitable relative permeability modifiers include water-soluble polymers with or without hydrophobic or hydrophilic modification. As used herein, "water-soluble" refers to at least 0.01 weight percent soluble in distilled water. A water-soluble polymer with hydrophobic modification is referred to herein as a "hydrophobically modified polymer." As used herein, the term "hydrophobic modification," or "hydrophobically modified," refers to the incorporation into the hydrophilic polymer structure of hydrophobic groups, wherein the alkyl chain length is from about 4 to about 22 carbons. A water-soluble polymer with hydrophilic modification is referred to herein as a "hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer. Combinations of hydrophobically modified polymers, hydrophilically modified polymers, and water-soluble polymers without hydrophobic or hydrophilic modification may be included as the relative permeability modifier in the treatment fluids or methods of the present invention.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. The polar heteroatoms present within the polymer backbone of the hydrophobically modified polymers may include, but are not limited to, oxygen, nitrogen, sulfur, or phosphorous.

The hydrophobically modified polymers may be synthesized using any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming hydrophobically modified polymers of the present invention should be capable of reacting with hydrophobic compounds. Suitable hydrophilic polymers may include, but are not limited to, homo- co-, or terpolymers of polyacrylamides, polyvinylamines, poly(vinylamines/vinyl alcohols), alkyl acrylate polymers in general, and derivatives thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly (methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers may comprise dialkyl amino pendant groups. In some embodiments, the hydrophilic polymers may comprise a dimethyl amino pendant group and a monomer comprising dimethylaminoethyl methacrylate or dimethylaminopropyl methacrylamide. In certain embodiments of the present invention, the hydrophilic polymers may comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone may include, but are not limited to, homo-, co-, or terpolymers of ascelluloses, chitosans, polyamides, polyetheramines, polyethyleneimines, polyhydroxyetheramines, polylysines, polysulfones, gums, starches, and derivatives thereof. In one embodiment, the starch may be a cationic starch. A suitable cationic starch may be formed by reacting a starch, such as corn, maize, waxy maize, potato, and/or tapioca with the reaction product of epichlorohydrin and trialkylamine.

The hydrophobic compounds that are capable of reacting with hydrophilic polymers to generate relative permeability modifiers useful in the present invention may include, but are not limited to, alkyl halides, sulfonates, sulfates, organic acids, and derivatives thereof. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the entire disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and derivatives thereof.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, alkyl dimethylammoniumpropyl methacrylamide halides, and derivatives thereof, wherein the alkyl groups have from about 4 to about 22 carbon atoms. In certain embodiments, the alkyl groups may have from about 7 to about 22 carbons. In certain embodiments, the alkyl groups may have from about 12 to about 18 carbons. In certain embodiments, the hydrophobically modified hydrophilic monomer may comprise octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, hexadecyl methacrylamide, and derivatives thereof.

Suitable hydrophobically modified polymers that may be formed from the above-described reactions may include, but are not limited to, an acrylamide/octadecyldimethylammoniumethyl methacrylate bromide copolymer, a dimethylaminoethyl methacrylate/vinyl pyrrolidone/hexadecyldimethylammoniumethyl methacrylate bromide terpolymer, an acrylamide/2-acrylamido-2-methyl propane sulfonic acid/2-ethylhexyl methacrylate terpolymer, and derivatives thereof. Another suitable hydrophobically modified polymer formed from the above-described reaction may be an amino methacrylate/alkyl amino methacrylate copolymer. A suitable dimethlyaminoethyl methacrylate/alkyl-dimethylammoniumethyl methacrylate copolymer may be a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may be a dimethylaminoethyl methacrylate/hexadecyl-dimethylammoniumethyl methacrylate bromide copolymer.

In another embodiment of the present invention, the relative permeability modifier may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. The polar heteroatoms present within the polymer backbone of the hydrophilically modified polymers may include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching of a hydrophilic polymer. The polymers suitable for forming the hydrophilically modified polymers used in the present invention should be capable of reacting with hydrophilic compounds. In certain embodiments, suitable polymers include, homo-, co-, or terpolymers, such as, but not limited to, polyacrylamides, polyvinylamines, poly (vinylamines/vinyl alcohols), and alkyl acrylate polymers in general. Examples of alkyl acrylate polymers that may be suitable include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), poly(methacrylic acid/ dimethylaminopropyl methacrylamide), and derivatives thereof. In certain embodiments, the polymers may comprise a polymer backbone and reactive amino groups in the polymer backbone or as pendant groups, the reactive amino groups capable of reacting with hydrophilic compounds. In some embodiments, the polymers may comprise dialkyl amino pendant groups. In some embodiments, the polymers comprise a dimethyl amino pendant group and at least one monomer comprising dimethylaminoethyl methacrylate or dimethylaminopropyl methacrylamide. In other embodiments, the polymers may comprise a polymer backbone comprising polar heteroatoms, wherein the polar heteroatoms present within the polymer backbone of the polymers may include, but are not limited to, oxygen, nitrogen, sulfur, or phosphorous. Suitable polymers that comprise polar heteroatoms within the polymer backbone may include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the polymers may include polyethers that comprise halogens, sulfonates, sulfates, organic acids, and derivatives thereof.

Examples of suitable polyethers include, but are not limited to, polyethylene oxides, polypropylene oxides, and polybutylene oxides, and copolymers, terpolymers, and mixtures thereof. In some embodiments, the polyether may comprise an epichlorohydrin-terminated polyethylene oxide methyl ether.

The hydrophilically modified polymers formed from the reaction of a polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above may include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer may comprise the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

In another embodiment of the present invention, the relative permeability modifiers comprise a water-soluble polymer without hydrophobic or hydrophilic modification. Examples of suitable water-soluble polymers may include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide quaternary salt derivatives of acrylic acid, and derivatives thereof.

In certain embodiments, the treatment fluids of the present invention may include a relative permeability modifier breaker. Suitable breakers may include, but are not limited to oxidizers. The choice of relative permeability modifier breaker may depend upon, among other things, the relative permeability modifier used. One of ordinary skill in the art, with the benefit of this disclosure, may recognize suitable relative permeability modifier breakers suitable for use in the treatment fluids and methods of the present invention.

Sufficient concentrations of a suitable relative permeability modifier may be present in the treatment fluids of the present invention to provide a desired degree of diversion of aqueous fluids. The amount of the relative permeability modifier to include in the treatment fluid depends on a number of factors including, the composition of the fluid to be diverted and the porosity of the formation. In some embodiments, a relative permeability modifier may be present in a treatment fluid of the present invention in an amount of about 0.05% to about 1.5% by weight of the composition. In some embodiments, a relative permeability modifier may be present in an amount of about 0.1% to about 0.5% by weight of the composition. In certain embodiments of the present invention, the relative permeability modifier may be provided in a concentrated aqueous solution prior to its combination with the other components necessary to form a treatment fluid of the present invention.

The treatment fluids of the present invention additionally comprise a delayed filter cake breaker. Delayed filter cake breakers useful in the treatment fluids and methods of the present invention may include, but are not limited to, acid generating compounds, enzymes, oxidizers, azo compounds, and any combination thereof. As used herein, the term "acid generating compound" refers to a composition that generates acid over time.

Examples of suitable acid generating compounds that may be suitable for use in the delayed filter cake breakers useful in the treatment fluids and methods of the present invention include, but are not limited to, esters, aliphatic polyesters, ortho esters, poly (ortho esters), ortho ethers; poly(ortho ethers); lactides, poly(lactides), glycolides, poly(glycolides), lactones, ϵ-caprolactones, poly(ϵ-caprolactones), hydroxybutyrates, poly(hydroxybutyrates), anhydrides, poly(anhydrides), polyascorbic acid, aliphatic carbonates, aliphatic polycarbonates, amino acids, poly(amino acids), ethylene oxide, poly(ethylene oxide), and polyphosphazenes, or copolymers thereof. Derivatives and combinations also may be suitable. Other suitable acid-generating compounds may include formate esters, acetate esters, and lactate esters such as, but not limited to, ethylene glycol monoformate, ethylene glycol diformate, diethylene glycol diformate, glyceryl monoformate, glyceryl diformate, glyceryl triformate, triethylene glycol diformate, formate esters of pentaerythritol, glyceryl triacetate, methyl lactate, butyl lactate, and derivatives thereof. Other suitable materials may be disclosed in U.S. Pat. Nos. 6,877,563 and 7,021,383, the entire disclosures of which are incorporated by reference. Examples of acid-generating compounds that may be suitable in the present invention are commercially available from Halliburton Energy Services, Inc., of Duncan, Okla., under the trade names NFC-2, ED-1, and BDF-325.

In those embodiments where an acid generating compound is used in the treatment fluid, the acid generating compound may generate an acid downhole in a delayed fashion that may remove at least a portion of a filter cake present in the subterranean formation. The acid generating compounds may be reacted with small amounts of reactive materials such as mineral acids, organic acids, acidic anhydrides, p-toluenesulfonic acid, and the like to lower the pH to accelerate the hydrolysis of the acid generating compound If desired. Similarly, the hydrolysis rate may be slowed by the addition of a small amount of a strong base such as NaOH, $Na_2CO_3$, and $Mg(OH)_2$. The acid generating compound also may generate alcohols downhole that may be beneficial to the operation.

Any composition or method known in the art that is capable of producing an acid may be used in conjunction with the present invention. Additional examples of such compositions and methods include, but are not limited to encapsulated acids, reaction of a aldehyde group with an oxidizer such as with reducing sugars, and/or any fermentation process that produces acid and oxidation of mineral surfaces.

In some embodiments, an acid generating compound may be present in a treatment fluid of the present invention in an amount of about 0.5% to about 40% by weight of the composition. In certain embodiments of the present invention, the acid generating compound may be provided in a concentrated aqueous solution prior to its combination with the other components necessary to form a treatment fluid of the present invention.

The delayed filter cake breakers useful in the treatment fluids and methods of the present invention also may comprise an enzyme. In certain embodiments, enzymes useful in the delayed filter cake breakers of the treatment fluids and methods of the present invention may catalyze the breakdown of an acid-generating compound to generate an acid. In certain embodiments, enzymes may be included in the delayed filter cake breakers useful in the treatment fluids or methods of the present invention at formation temperatures below about 160° F. Suitable enzymes may include, but are not limited to, esterases, amylases, xanthanases, gluconases, cellulases, mannanases, and any combination thereof. Examples of suitable enzymes may includes, but are not limited to, those available commercially under the trade names NFC-3™ and NFC-4™, available from Halliburton Energy Services, Inc., of Duncan, Okla., as well as ARCASOLVE™, available from Cleansorb Limited of Guildford, Surrey, United Kingdom. In certain embodiments, the enzyme may be present in an amount of about 0.001% to about 1% by weight of the composition.

The delayed filter cake breakers useful in the treatment fluids and methods of the present invention may also comprise an oxidizer. Examples of suitable oxidizers may include, but are not limited to, t-butyl hydroperoxide and sodium perborate. In certain embodiments, the oxidizer may be present in an amount of about 0.001% to about 5% by weight of the composition.

The delayed filter cake breakers useful in the treatment fluids and methods of the present invention may also comprise an azo compound. Examples of suitable azo compounds may include, but are not limited to, 2,2'-Azobis(2-amidinopropane), dihydrochloride, 2,2'-Azobis-2-methyl-n-(2-hydroxyethyl)propionamide, 4,4'-Azobis(4-cyanovaleric acid). In certain embodiments, the azo compound may be present in an amount of about 0.001% to about 1% by weight of the composition. Other free radical generators may be used as well.

The treatment fluids of the present invention may further comprise particulates, such as proppant particulates or gravel particulates. Such particulates may be included in the treatment fluids of the present invention, for example, when a gravel pack is to be formed in at least a portion of the well bore where the filter cake is removed. Particulates suitable for use in the present invention may comprise any material suitable for use in subterranean operations. Suitable materials for these particulates may include, but are not limited to, sand, bauxite, ceramic materials, glass materials, polymer materials, TEFLON® (polytetrafluoroethylene) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount of about 0.5 pounds per gallon ("ppg") to about 30 ppg by volume of the treatment fluid.

In certain embodiments, the delayed filter cake breaker may be introduced into the well bore independent of other treatment fluids. In certain embodiments, the delayed filter cake breaker may be introduced into the well bore on a gravel particulate by placing the delayed filter cake breaker in a solution and/or treatment fluid that comprises the particulate (e.g., a gravel pack fluid), which may be done prior to, during, or subsequent to introducing the proppant particulate or gravel particulate into a well bore.

The treatment fluids and methods of the present invention may, when introduced with gravel particulates into a well bore, be used for gravel-packing operations. Such a gravel-packing operation may comprise placing a screen in the well bore and packing the surrounding annulus between the screen and the well bore with gravel of a specific size designed to prevent the passage of formation sand. The screen may comprise a filter assembly used to retain the gravel placed during the gravel-pack operation. A wide range of sizes and screen configurations are available to suit the characteristics of the gravel particulates used. Similarly, a wide range of sizes of gravel particulates are available to suit the characteristics of the unconsolidated particulates in the subterranean formation. To install the gravel pack, the gravel may be carried to the formation in the form of a slurry by mixing the gravel particulates with the treatment fluids of the present invention. The resulting structure presents a barrier to migrating sand from the formation while still permitting fluid flow.

In certain embodiments, the treatment fluids of the present invention may be used to coat a sand screen for use in a gravel packing operation. Examples of coated sand screens are described in U.S. Patent Application Publication 2005/0072570, the entire disclosure of which is incorporated herein by reference.

In certain embodiments, the present disclosure also provides particulates at least partially coated with a delayed filter cake breaker. Examples of particulates at least partially coated with a filter cake breaker, as well as methods of using such particulates, are described in U.S. Patent Application Publication 2005/0034868 the entire disclosure of which is incorporated herein by reference.

In some embodiments, other additives may optionally be included in the treatment fluids of the present invention. Examples of such additives may include, but are not limited to, salts, buffers, pH control additives, gas generators, enzyme substrates, additional surfactants (e.g., non-ionic surfactants), fluid loss control additives, acids, gases (e.g., nitrogen, carbon dioxide), surface modifying agents, tackifying agents, foamers, corrosion inhibitors, additional scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, wetting agents, and coating enhancement agents. A person of ordinary skill in the art, with the benefit of this disclosure, will recognize when such optional additives should be included in a treatment fluid used in the present invention, as well as the appropriate amounts of those additives to include.

By means of example, which is not intended to limit the scope of the present invention, a suitable treatment fluid of the present invention may comprise 10 M sodium chloride brine, 15% NFC-2 by weight of the composition, and 67 gal/Mgal HPT-1 relative permeability modifier commercially available from Halliburton Energy Services, Inc., of Duncan, Okla.

In certain embodiments, the present disclosure provides a method comprising providing a treatment fluid comprising a relative permeability modifier, a delayed filter cake breaker, and a carrier fluid, contacting at least a portion of a filter cake in a subterranean formation with the treatment fluid, and removing at least a portion of the filter cake.

In certain embodiments, the present disclosure provides a method comprising providing a treatment fluid comprising a relative permeability modifier, a delayed filter cake breaker, a plurality of particulates, and a carrier fluid, contacting a portion of a subterranean formation with the treatment fluid, and depositing at least a portion of the plurality of particulates in a portion of the subterranean formation to form a gravel pack while removing at least a portion of a filter cake contained in a portion of the subterranean formation.

In certain embodiments, the present disclosure provides a treatment fluid comprising a relative permeability modifier, a delayed filter cake breaker, a plurality of particulates, and a carrier fluid.

To facilitate a better understanding of the present invention, the following examples of the preferred embodiments are given. In no way should the following examples be read to limit, or define, the scope of the invention.

EXAMPLE

A regain permeability test was performed on a core sample from a sandstone formation offshore South America. The initial kerosene permeability was 1478 and the initial porosity was 0.258. A drill-in fluid was formulated in a 9.3 pound per gallon KCl/NaCl brine with 45 lbs/bbl (pounds per barrel) of calcium carbonate bridging particles, 1.25 lbs/bbl xanthan, 5 lbs/bbl starch derivative, 3.3 lbs/bbl lubricant, along with a bactericide, shale inhibitor and caustic. The drill-in fluid was applied to the face of the core at 155° F. and a 500 psi differential pressure, and was held overnight. The drill-in fluid was displaced from the test system with the clean-up solution in the 9.3 pounds per gallon KCl/NaCl brine with 0.67% HPT-1 (relative permeability modifier), 15% BDF-325 (delayed release acid), and 0.6% HT Breaker (oxidizer breaker). The clean-up solution was flowed across the face of the core for 8 hours at 500 psi differential pressure to show that no premature break through was occurring. The cell was then shut in static for 72 hours. After this, a permeability test for the core was performed using kerosene and a value of 87.2 percent return permeability was obtained.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Consequently, the invention is intended to be limited only by the spirit and scope of the appended claims, giving full cognizance to equivalents in all respects. Moreover, the indefinite articles "a" and "an", as used in the claims, are defined herein to mean to one or more than one of the element that it introduces. The terms in the claims have their plain, ordinary meaning unless otherwise explicitly and clearly defined by the patentee.

What is claimed is:

1. A method comprising:
    providing a treatment fluid comprising a relative permeability modifier, a delayed filter cake breaker, and a carrier fluid;
        wherein the delayed filter cake breaker comprises one or more components selected from the group consisting of an acid-generating compound, an azo compound, and any combination thereof;
    contacting at least a portion of a filter cake in a subterranean formation with the treatment fluid; and
    removing at least a portion of the filter cake.

2. The method of claim 1 wherein the acid-generating compound comprises at least one acid-generating compound selected from the group consisting of: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); an anhydride; a poly(anhydride); an aliphatic carbonate; an aliphatic polycarbonate; an amino acid; a poly(amino acid); ethylene oxide; poly(ethylene oxide); a polyphosphazene, any copolymer thereof, and any derivative thereof.

3. The method of claim 1 wherein the acid-generating compound comprises at least one acid-generating compound selected from the group consisting of: a formate ester; an acetate ester; a lactate ester; ethylene glycol monoformate; ethylene glycol diformate; diethylene glycol diformate; glyceryl monoformate; glyceryl diformate; glyceryl triformate; triethylene glycol diformate; a formate ester of pentaerythritol; glyceryl triacetate; methyl lactate; butyl lactate; and any derivative thereof.

4. The method of claim 1 wherein the relative permeability modifier comprises at least one relative permeability modifier selected from the group consisting of: a water-soluble, hydrophobically modified polymer; a water-soluble, hydrophilically modified polymer; a water-soluble polymer without hydrophobic or hydrophilic modification; and any combination thereof.

5. The method of claim 1 wherein the relative permeability modifier is present in an amount of about 0.05% to about 1.5% by weight of the treatment fluid.

6. The method of claim 1, wherein the treatment fluid further comprises a relative permeability modifier breaker.

7. A method comprising:
    providing a treatment fluid comprising a relative permeability modifier, a delayed filter cake breaker, a plurality of particulates, and a carrier fluid;
        wherein the delayed filter cake breaker comprises one or more components selected from the group consisting of an acid-generating compound, an azo compound, and any combination thereof;

contacting at least a portion of a subterranean formation with the treatment fluid; and depositing at least a portion of the plurality of particulates in at least a portion of the subterranean formation to form a gravel pack while removing at least a portion of a filter cake contained in at least a portion of the subterranean formation.

8. The method of claim 7 wherein the acid-generating compound comprises at least one acid-generating compound selected from the group consisting of: an ester; an aliphatic polyester; an ortho ester; a poly(ortho ester); an ortho ether; a poly(ortho ether); a lactide; a poly(lactide); a glycolide; a poly(glycolide); an ε-caprolactone; a poly(ε-caprolactone); a hydroxybutyrate; a poly(hydroxybutyrate); anhydride; a poly (anhydride); an aliphatic carbonate; an aliphatic polycarbonate; an amino acid; a poly(amino acid); ethylene oxide; poly (ethylene oxide); a polyphosphazene, any copolymer thereof, and any derivative thereof.

9. The method of claim 7 wherein the acid-generating compound comprises at least one acid-generating compound selected from the group consisting of: a formate ester; an acetate ester; a lactate ester; ethylene glycol monoformate; ethylene glycol diformate; diethylene glycol diformate; glyceryl monoformate; glyceryl diformate; glyceryl triformate; triethylene glycol diformate; a formate ester of pentaerythritol; glyceryl triacetate; methyl lactate; butyl lactate; and any derivative thereof.

10. The method of claim 7 wherein the relative permeability modifier comprises at least one relative permeability modifier selected from the group consisting of: a water-soluble, hydrophobically modified polymer; a water-soluble, hydrophilically modified polymer; a water-soluble polymer without hydrophobic or hydrophilic modification; and any combination thereof.

11. The method of claim 7 wherein the relative permeability modifier is present in an amount of about 0.05% to about 1.5% by weight of the treatment fluid.

12. The method of claim 7, wherein the treatment fluid further comprises a relative permeability modifier breaker.

* * * * *